United States Patent
Woo et al.

(10) Patent No.: US 12,409,832 B2
(45) Date of Patent: Sep. 9, 2025

(54) HYBRID ELECTRIC VEHICLE AND SHIFT CONTROL METHOD THEREOF

(71) Applicants: Hyundai Motor Company, Seoul (KR); Kia Corporation, Seoul (KR)

(72) Inventors: Sang Kook Woo, Seongnam-si (KR); Won Bin Lee, Suwon-si (KR); Soo Bang Lee, Suwon-si (KR); Seul Gi Lee, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 431 days.

(21) Appl. No.: 17/942,794

(22) Filed: Sep. 12, 2022

(65) Prior Publication Data
US 2023/0373464 A1    Nov. 23, 2023

(30) Foreign Application Priority Data
May 17, 2022  (KR) .................. 10-2022-0060175

(51) Int. Cl.
*B60W 20/20*   (2016.01)
*B60W 20/30*   (2016.01)
*B60W 20/40*   (2016.01)

(52) U.S. Cl.
CPC ............ *B60W 20/20* (2013.01); *B60W 20/30* (2013.01); *B60W 20/40* (2013.01); *B60W 2510/0208* (2013.01); *B60W 2510/0657* (2013.01); *B60W 2510/1025* (2013.01); *B60W 2710/083* (2013.01); *B60W 2710/1022* (2013.01)

(58) Field of Classification Search
CPC ...... B60W 20/20; B60W 20/30; B60W 20/40; B60W 2510/0208; B60W 2510/0657; B60W 2510/1025; B60W 2710/083; B60W 2710/1022; B60W 20/11; B60W 30/19; B60W 10/02; B60W 10/06; B60W 10/08; B60W 10/11
USPC ............................................... 701/22
See application file for complete search history.

(56) References Cited

U.S. PATENT DOCUMENTS 7,727,112 B2    6/2010  Kakinami et al.
2008/0114522 A1*  5/2008  Matsubara ............. B60K 6/445
                                    701/99
(Continued)

FOREIGN PATENT DOCUMENTS

JP    20070314146    12/2007
JP    20080068704    3/2008
(Continued)

*Primary Examiner* — Kira Nguyen
(74) *Attorney, Agent, or Firm* — Fish & Richardson P.C.

(57) ABSTRACT

A hybrid electric vehicle includes an engine, a first motor directly connected to the engine, an engine clutch, a second motor selectively connected to the first motor through the engine clutch, a transmission directly connected to the second motor, a transmission controller configured to determine whether the transmission needs to be shifted, and a hybrid controller configured to compare a target torque reduction with intervention limits of the first and second motors when the engine clutch is in a locked-up state, to set torque reduction amounts of the engine, the first motor, and the second motor, respectively, and to output a torque command for controlling the torques of the engine, the first motor, and the second motor, respectively.

16 Claims, 10 Drawing Sheets

(56) References Cited

U.S. PATENT DOCUMENTS

| | | | |
|---|---|---|---|
| 2009/0159349 A1* | 6/2009 | Ebuchi | B60W 10/02 903/945 |
| 2015/0073635 A1* | 3/2015 | Takahashi | B60W 10/12 180/65.265 |
| 2016/0159341 A1* | 6/2016 | Tabata | B60W 10/06 180/65.23 |
| 2016/0257297 A1 | 9/2016 | Oshiumi et al. | |
| 2017/0197610 A1 | 7/2017 | Sato | |
| 2022/0135020 A1* | 5/2022 | Mannsperger | B60W 10/023 701/22 |

FOREIGN PATENT DOCUMENTS

| | | |
|---|---|---|
| JP | 20160101852 | 6/2016 |
| KR | 101836690 | 3/2018 |
| KR | 1020190067375 | 6/2019 |
| KR | 1020210072978 | 6/2021 |

\* cited by examiner

HYBRID ELECTRIC VEHICLE AND SHIFT CONTROL METHOD THEREOF

CROSS-REFERENCE TO RELATED APPLICATION

The present application claims priority to Korean Patent Application No. 10-2022-0060175, filed May 17, 2022, the entire contents of which are incorporated herein for all purposes by this reference.

TECHNICAL FIELD

The present disclosure relates to a hybrid electric vehicle capable of securing a consistent and accurate shift feeling through intervention control during shifting, and a shift control method thereof.

BACKGROUND

Recently, as interest in the environment increases, eco-friendly vehicles having an electric motor as a power source are on the rise. An eco-friendly vehicle is also referred to as an electrified vehicle, and a representative example thereof may include a hybrid electric vehicle (HEV) or an electric vehicle (EV).

A hybrid electric vehicle having two power sources composed of an engine and an electric motor may provide optimal output and torque depending on how the engine and the electric motor are harmoniously operated in the process of driving with the two power sources.

In particular, in a hybrid electric vehicle employing a parallel type (or Transmission Mounted Electric Device (TMED) type) hybrid system in which an electric motor and an engine clutch (EC) are mounted between an engine and a transmission, the outputs of the engine and the electric motor may be simultaneously transmitted to a driving shaft.

Meanwhile, when the transmission performs the shifting operation, in particular, during the shift to a higher stage, a vehicle may perform intervention control to reduce the torque of a driving source and the kinetic energy of an input shaft of the transmission for smooth shift and clutch protection.

During the intervention control, a problem may arise in that quick engagement of a coupling clutch for the alleviation of the shift delay feeling causes shift shock to occur, and excessively prolonged shifting time for alleviation of shock causes a sensation of delay, or causes thermal damage to a friction material.

When a hybrid electric vehicle performs intervention control on the engine, since consistency and accuracy may be lacking due to the characteristics of the engine, a sensation of shift delay or shift shock can occur during shifting.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a hybrid electric vehicle employing a plurality of motors so that a consistent and accurate shift feeling is secured by maximizing the intervention control amount for the motors and minimizing the intervention control for an engine, during shifting.

The technical problems to be achieved in the present disclosure are not limited to the technical problems mentioned above, and other technical problems not mentioned will be clearly understood by those of ordinary skill in the art to which the present disclosure belongs from the description below.

In order to accomplish the above objective, according to an aspect of the present disclosure, there is provided a hybrid electric vehicle including: an engine; a first motor directly connected to the engine; an engine clutch; a second motor selectively connected to the first motor through the engine clutch; a transmission directly connected to the second motor; a transmission controller configured to determine whether the transmission needs to be shifted; and a hybrid controller configured to compare a target torque reduction amount according to a shift signal received from the transmission controller with an intervention limit of the first motor and an intervention limit of the second motor when the engine clutch is in a locked-up state, to set torque reduction amounts of the engine, the first motor, and the second motor, respectively, based on the comparison result, and to output a torque command for controlling the torques of the engine, the first motor, and the second motor, respectively, based on the set torque reduction amounts.

Further, according to another aspect of the present disclosure, there is provided a method of controlling shifting of a hybrid electric vehicle including an engine, a first motor, an engine clutch, a second motor, and a transmission, the method including: calculating a target torque reduction amount when the transmission is required to shift; determining whether the engine clutch is in a locked-up state; when the engine clutch is determined to be in the locked-up state, setting an intervention control sequence by designating the first motor and the second motor as a higher priority control motor and a lower priority control motor; setting a torque reduction amount of the higher priority control motor based on a result of comparing the target torque reduction amount with an intervention limit of the higher priority control motor; and when the target torque reduction amount exceeds the intervention limit of the higher priority control motor, setting a torque reduction amount of the lower priority control motor, wherein the first motor is directly connected to the engine, and the second motor is directly connected to an input shaft of the transmission.

According to the present disclosure, a consistent and precise shifting feeling can be secured by maximizing the intervention control amount for the plurality of motors and minimizing the intervention control amount for the engine during shifting.

It will be appreciated by those skilled in the art that the effects that can be achieved with the present disclosure are not limited to those described above and other advantages of the present disclosure will be clearly understood from the following detailed description.

DETAILED DESCRIPTION

Figure 1:
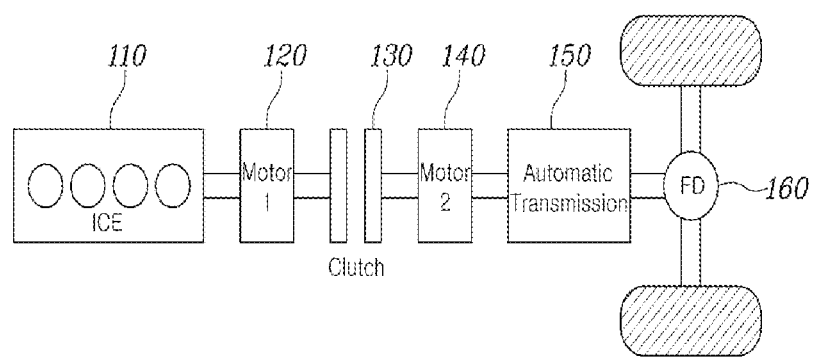
FIG. 1 illustrates an example of a configuration of a power train in a hybrid electric vehicle according to an example of the present disclosure.

Hereinafter, implementations disclosed in the present specification will be described in detail with reference to the accompanying drawings, wherein the same or similar components are assigned the same reference numbers, and a redundant description thereof will be omitted. The suffixes "module" and "part" for the components used in the following description are given or interchanged in consideration of only the ease of constructing the specification, and do not have distinct meanings or functions by themselves. In addition, in describing the implementations disclosed in the present specification, when it is determined that detailed descriptions of related known technologies may obscure the gist of the implementations disclosed in the present specification, the detailed description thereof will be omitted. In addition, the accompanying drawings are only for easy understanding of the implementations disclosed in the present specification so that the technical spirit disclosed herein is not limited by the accompanying drawings, so the accompanying drawings should be understood as covering all changes, equivalents, or substitutes included in the spirit and scope of the present disclosure.

It will be understood that although the terms "first", "second", etc. may be used herein to describe various elements, these elements should not be limited by these terms. These terms are only used to distinguish one element from another element.

It will be understood that when an element is referred to as being "connected" or "coupled" to another element, it can be directly connected or coupled to the other element or intervening elements may be present therebetween. In contrast, it will be understood that when an element is referred to as being "directly connected" to another element, there are no intervening elements present.

As used herein, the singular forms "a", "an", and "the" are intended to include the plural forms as well, unless the context clearly indicates otherwise.

It will be further understood that the terms "comprises" and/or "comprising", or "includes" and/or "including", when used in this specification, specify the presence of stated features, integers, steps, operations, elements, components or combinations thereof, but do not preclude the presence or addition of one or more other features, integers, steps, operations, elements, components, or combinations thereof.

In addition, a unit or control unit included in the names of a motor control unit (MCU), a hybrid control unit (HCU), etc. is only a term widely used in the naming of a controller that controls a specific vehicle function, and does not mean a generic function unit. For example, respective controller may include a communication device that communicates with other controllers or sensors to control its own function, a memory that stores an operating system or logic command and input/output information, and one or more processors that perform judgement, operation, and determination necessary for controlling their own functions.

Prior to describing a shaft control system configuration and a shift control method of a hybrid electric vehicle according to implementations of the present disclosure, a structure and a control system of a hybrid electric vehicle applicable to the implementations will be first described.

FIG. 1 illustrates an example of a configuration of a power train in a hybrid electric vehicle according to an implementation of the present disclosure.

Referring to FIG. 1, a power train of a hybrid electric vehicle employing a parallel type hybrid system in which two motors 120 and 140 and an engine clutch 130 are mounted between an internal combustion engine (ICE) 110 and a transmission 150 is illustrated. Such a parallel hybrid system is also called a transmission mounted electric drive (TMED) hybrid system, because the motor 140 is always connected to an input stage of the transmission 150.

Here, in the two motors 120 and 140, the first motor 120 is disposed between the engine 110 and one side of the engine clutch 130, and an engine shaft of the engine 110 and a first motor shaft of the first motor 120 are directly connected to each other so that the engine shaft and the motor shaft can rotate together at all times.

One side of a second motor shaft of the second motor 140 can be connected to the other side of the engine clutch 130, and the other side of the second motor shaft can be directly connected to the input stage of the transmission 150.

The second motor 140 may have a greater output than the first motor 120, so the second motor 140 may serve as a driving motor. In addition, the first motor 120 may function as a starting motor for cranking the engine 110 when the engine 110 is started, may recover rotational energy of the engine 110 through power generation upon stopping of the engine 110, and may perform power generation with the power of the engine 110 during the operation of the engine 110.

When a driver steps on an accelerator pedal after starting of a hybrid electric vehicle (e.g., HEV Ready) having a power train as illustrated in FIG. 1, the second motor 140 is driven using the power of a battery in a state in which the engine clutch 130 is opened. Accordingly, wheels are activated while the power of the second motor 140 is transmitted through the transmission 150 and a final drive (FD) 160 (i.e., the EV mode). When a vehicle is gradually accelerated so a greater driving force is required, the first motor 120 may operate to crank the engine 110.

When the difference in rotational speed between the engine 110 and the second motor 140 is within a predetermined range after the engine 110 is started, the engine clutch 130 is engaged between the engine 110 and the second motor 140 so that the engine 110 and the second motor 140 will rotate together (i.e., switching from EV mode to HEV mode). Accordingly, through the torque blending process, the output of the second motor 140 is lowered and the output of the engine 110 is increased, thereby satisfying the driver's required torque. In the HEV mode, the engine 110 can satisfy most of the required torque, and the difference between the engine torque and the required torque can be compensated through at least one of the first motor 120 and the second motor 140. For example, when the engine 110 outputs a torque higher than the required torque in consideration of the efficiency of the engine 110, the first motor 120 or the second motor 140 generates power by the engine torque surplus, and when the engine torque is less than the required torque, at least one of the first motor 120 and the second motor 140 may output insufficient torque.

When a preset engine off condition as in vehicle deceleration, or the like, is satisfied, the engine clutch 130 is opened and the engine 110 is stopped (i.e., switching from the HEV mode to the EV mode). During deceleration, the battery is charged through the second motor 140 using the driving force of the wheels, which is called a braking energy regeneration or a regenerative braking.

In general, the transmission 150 can be a stepped transmission or a multi-plate clutch, such as a dual-clutch transmission (DCT).

Figure 2:
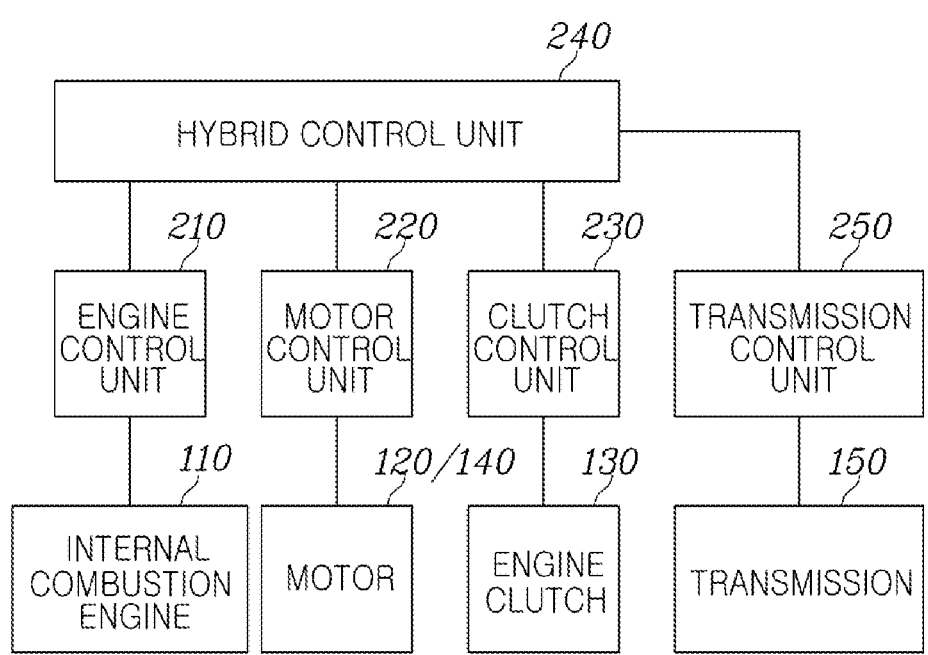
FIG. 2 illustrates an example of a configuration of a control system in a hybrid electric vehicle according to an example of the present disclosure.

FIG. 2 illustrates an example of a configuration of a control system in a hybrid electric vehicle according to an implementation of the present disclosure.

Referring to FIG. 2, in a hybrid electric vehicle to which implementations of the present disclosure can be applied, the internal combustion engine 110 can be controlled by an engine controller 210, the first motor 120 and the second motor 140 can be torque-controlled by a motor controller (MCU) 220, and the engine clutch 130 can be controlled by a clutch is controller 230. Here, the engine controller 210 is also called an engine management system (EMS). In addition, the transmission 150 is controlled by a transmission controller 250.

The motor controller 220 can control a gate drive unit with a pulse width modulation (PWM) control signal based on a motor angle, a phase voltage, a phase current, and required torque of each motor 120 or 140. Accordingly, the gate drive unit can control an inverter that drives each of the motors 120 and 140.

Each controller can be connected to a hybrid controller (or hybrid control unit (HCU)) 240 as its upper controller that controls the overall power train including the mode switching process to provide information about engine clutch control and/or information about engine stop control, which is required during drive mode switching or gear shift under the control of the hybrid controller 240, to the hybrid controller 240 or to perform an operation according to a control signal.

For example, the hybrid controller 240 determines whether to perform switching between EV-HEV modes or CD-CS modes (in the case of PHEV) according to a vehicle driving state. To this end, the hybrid controller can determine disengaging (opening) timing of the engine clutch 130, and performs hydraulic control during disengagement. In addition, the hybrid controller 240 can determine the state (Lock-up, Slip, Open, etc.) of the engine clutch 130 and control the timing of stopping the fuel injection of the engine 110. Also, the hybrid controller can transmit a torque command for controlling the torque of the first motor 120 to the motor controller 220 for engine stop control to control engine rotational energy recovery. In addition, the hybrid controller 240 can determine the state of each of drive sources 110, 120, and 140 and thus determine the required drive force to be shared by respective drive sources 110, 120, and 140, and transmit a torque command to the controllers 210 and 220 for controlling the respective drive sources in order to satisfy the required torque.

Of course, it will be apparent to those skilled in the art that the above-described connection relationship between the controllers and the function/classification of respective controllers are exemplary and are not limited by their names. For example, the hybrid controller 240 can be implemented such that the corresponding function is replaced and provided in any one of the other controllers, or the corresponding function can be distributed and provided in two or more of the other controllers.

It is obvious to those of skilled in the art that the configurations of FIGS. 1 and 2 described above are only one configuration example of a hybrid electric vehicle, and the hybrid electric vehicle applicable to the implementation is not limited to this structure.

An implementation of the present disclosure proposes a hybrid electric vehicle, in which, during shifting in the transmission 150, the intervention control amount for the motor is maximized using a plurality of motors 120 and 140, and the intervention control amount for the engine 110 is minimized, which can secure a consistent and sophisticated shift feel. A structure for this is illustrated in FIG. 3.

Figure 3:
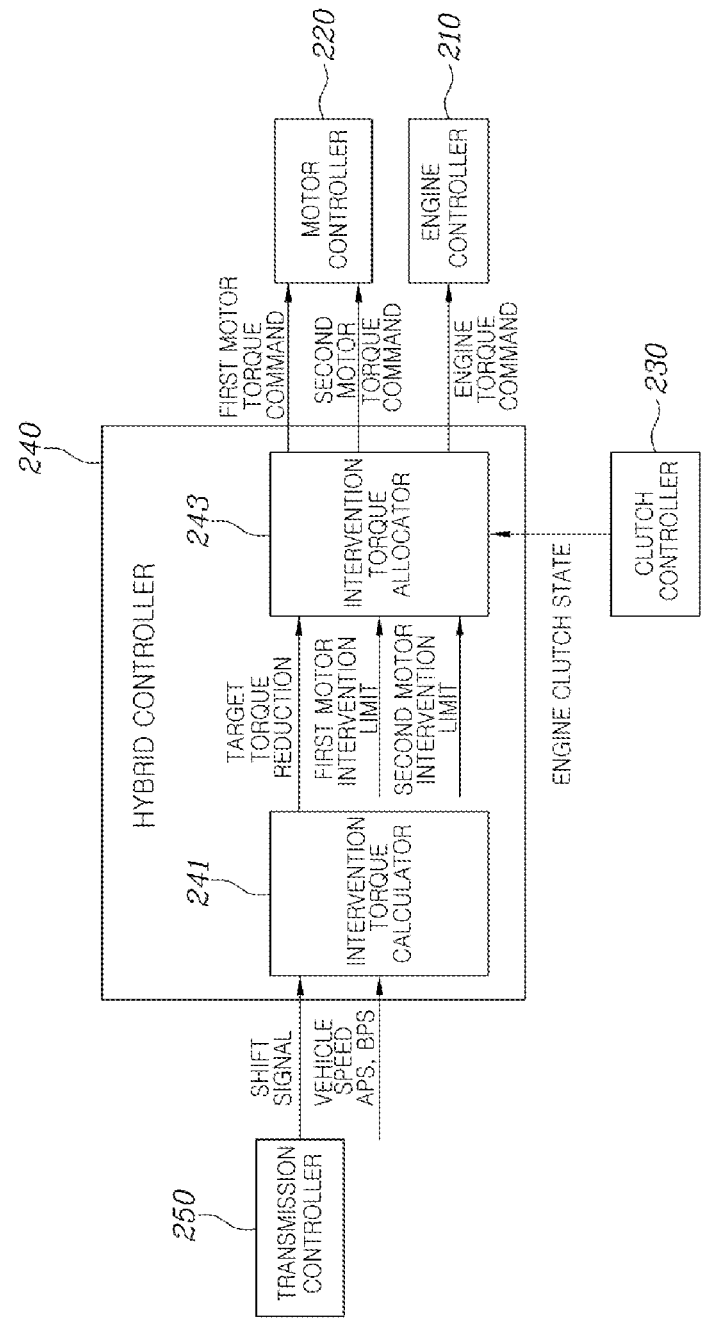
FIG. 3 is a block diagram illustrating an exemplary configuration of a shift control system of a hybrid electric vehicle according to an example of the present disclosure.

FIG. 3 is a block diagram illustrating an exemplary configuration of a shift control system of a hybrid electric vehicle according to an implementation of the present disclosure.

Referring to FIG. 3, the transmission controller 250 can determine whether the transmission 150 needs to shift, and, when shifting is required, transmit a shift signal to the hybrid controller 240. In this case, the shift signal may be an intervention request, but is not limited thereto. The hybrid controller 240 can include an intervention torque calculator 241 that receives the shift signal from the transmission controller 250 and calculates the target torque reduction amount, and an intervention torque allocator 243 that allocates the calculated target torque reduction amount to the engine 110, the first motor 120, and the second motor 140.

Upon receipt of a shift signal from the transmission controller 250, in an activated state of the intervention control, the intervention torque calculator 241 can calculate the target torque reduction amount based on the vehicle speed, an accelerator pedal sensor (APS) value, a brake pedal sensor (BPS) value, etc. Although the intervention torque calculator 241 calculates the target torque reduction amount in an implementation, in another implementation, the transmission controller 250 can determine the target torque reduction amount and then transmit the same to the hybrid controller 240. In this case, the intervention torque calculator 241 can be removed from the hybrid controller 240, and the intervention torque allocator 243 can receive the shift signal from the transmission controller 250, and allocate the target torque reduction amount according to the shift signal.

The intervention torque allocator 243 can allocate the calculated target torque reduction amount by setting the torque reduction amounts for the engine 110, the first motor 120, and the second motor 140, respectively, based on whether the engine clutch 130 is in a locked-up state, the intervention limit of the first motor 120, and the intervention limit of the second motor 140. Then, the intervention torque allocator 243 can output a torque command for controlling the torque of the first motor 120 to the motor controller 220 based on the torque reduction amount of the first motor 120, and a torque command for controlling the torque of the second motor 140 to the motor controller 220 based on the torque reduction amount of the second motor 140. Similarly, the intervention torque allocator 243 can output a torque command for controlling the torque of the engine 110 to the engine controller 210 based on the torque reduction amount of the engine 110.

The intervention limit of the first motor 120 means the sum of the current output torque of the first motor 120 and the reverse torque corresponding to the capacity that can maximally charge a battery with the first motor 120, and can be determined depending on the state of charge (SOC) of the battery, the internal temperature of the battery, the internal temperature of the first motor 120, and the specification of the first motor 120. Similarly, the intervention limit of the first motor 120 means the sum of the current output torque of the second motor 140 and the reverse torque corresponding to the capacity that can maximally charge a battery with the second motor 140, and can be determined depending on the state of charge (SOC) of the battery, the internal temperature of the battery, the internal temperature of the second motor 140, and the specification of the second motor 140.

Hereinafter, an operation method in which the intervention torque allocator 243 sets the torque reduction amounts for the engine 110, the first motor 120, and the second motor 140, respectively, in order to allocate the target torque reduction amounts will be described in detail.

First, the intervention torque allocator 243 can determine whether the engine clutch 130 is in a locked-up state by receiving information on the state of the engine clutch 130 from the clutch controller 230.

When the engine clutch 130 is not in the lock-up state, it can be difficult to control the input torque of the transmission 150 with intervention control for the engine 110 and the first motor 120, so the intervention torque allocator 243 can perform the intervention control only for the second motor 140. More specifically, when the target torque reduction amount is less than or equal to the intervention limit of the second motor 140, the intervention torque allocator 243 can set the torque reduction amount of the second motor 140 as the target torque reduction amount, and when the target torque reduction amount exceeds the intervention limit of the second motor 140, set the torque reduction amount of the second motor 140 as the intervention limit of the second motor 140.

When the engine clutch 130 is in a locked-up state, the intervention torque allocator 243 can perform intervention control for all of the engine 110, the first motor 120, and the second motor 140. In this case, the intervention torque allocator 243 may set the torque reduction amount of each of the engine 110, the first motor 120, and the second motor 140 based on the result of comparing the target torque reduction amount with the intervention limit of the first motor 120 and/or the intervention limit of the second motor 140. In addition, since the interventional control for the engine 110 lacks consistency and sophistication, the interventional torque allocator 243 may perform interventional control on the first motor 120 and the second motor 140 first, and when the target torque reduction amount still remains, further perform the intervention control on the engine 110 to compensate for the shortfall in the control.

When the engine clutch 130 is in a locked-up state, the intervention torque allocator 243 may compare the efficiency of the first motor 120 and the efficiency of the second motor 140, and based on the comparison result, set the intervention control sequence by designating the first motor 120 and the second motor 140 as a higher priority control motor and a lower priority control motor. More specifically, the intervention torque allocator 243 may calculate the efficiencies of the first motor 120 and the second motor 140 according to a target operating point based on the output torque and revolution per minute (RPM) of the first motor 120 and the second motor 140, in which the target torque reduction amount is reflected through the intervention control. In addition, the intervention torque allocator 243 may set a motor having higher efficiency, among the first motor 120 and the second motor 140, as the higher priority control motor, and a motor having lower efficiency as the lower priority control motor.

The intervention torque allocator 243 may compare the target torque reduction amount with the intervention limit of the higher priority control motor to set the torque reduction amount of the higher priority control motor. More specifically, when the target torque reduction amount is less than or equal to the intervention limit of the higher priority control motor, the intervention torque allocator 243 may set the torque reduction amount of the higher priority control motor as the target torque reduction amount, and set respective torque reduction amounts of the lower priority control motor and the engine 110 to '0'. Conversely, when the target torque reduction amount exceeds the intervention limit of the higher priority control motor, the intervention torque allocator 243 may set the torque reduction amount of the higher priority control motor as the intervention limit of the higher priority control motor, and compensate for the shortfall in the control (a difference between the target torque reduction amount and the intervention limit of the higher priority control motor) with the torque reduction amount of the lower priority control motor and/or the engine 110.

When the target torque reduction amount exceeds the intervention limit of the higher priority control motor, the intervention torque allocator 243 may compare the target torque reduction amount with the sum of the intervention limit of the higher priority control motor and the intervention limit of the lower priority control motor to set the torque reduction amount of the lower priority control motor. More specifically, when the target torque reduction amount is less than or equal to the sum of the intervention limit of the higher priority control motor and the intervention limit of the lower priority control motor, the intervention torque allocator 243 may set the torque reduction amount of the lower priority control motor to the difference between the target torque reduction amount and the torque reduction amount of the higher priority control motor. In this case, the torque reduction amount of the engine may be set to '0'. Conversely, when the target torque reduction amount exceeds the sum of the intervention limit of the priority control motor and the intervention limit of the lower priority control motor, the intervention torque allocator 243 may set the torque reduction amount of the lower priority control motor to the intervention limit of the lower priority control motor, and the shortfall in the control (difference between the target torque reduction amount and the sum of the intervention limit of the higher priority control motor and the intervention limit of the lower priority control motor) to the torque reduction amount of the engine 110.

As described above, the hybrid controller 240 may use a plurality of motors during shifting to maximize the intervention control amount for the motor and minimize the intervention control amount for the engine, thereby securing a consistent and sophisticated shifting feeling.

Figure 4:
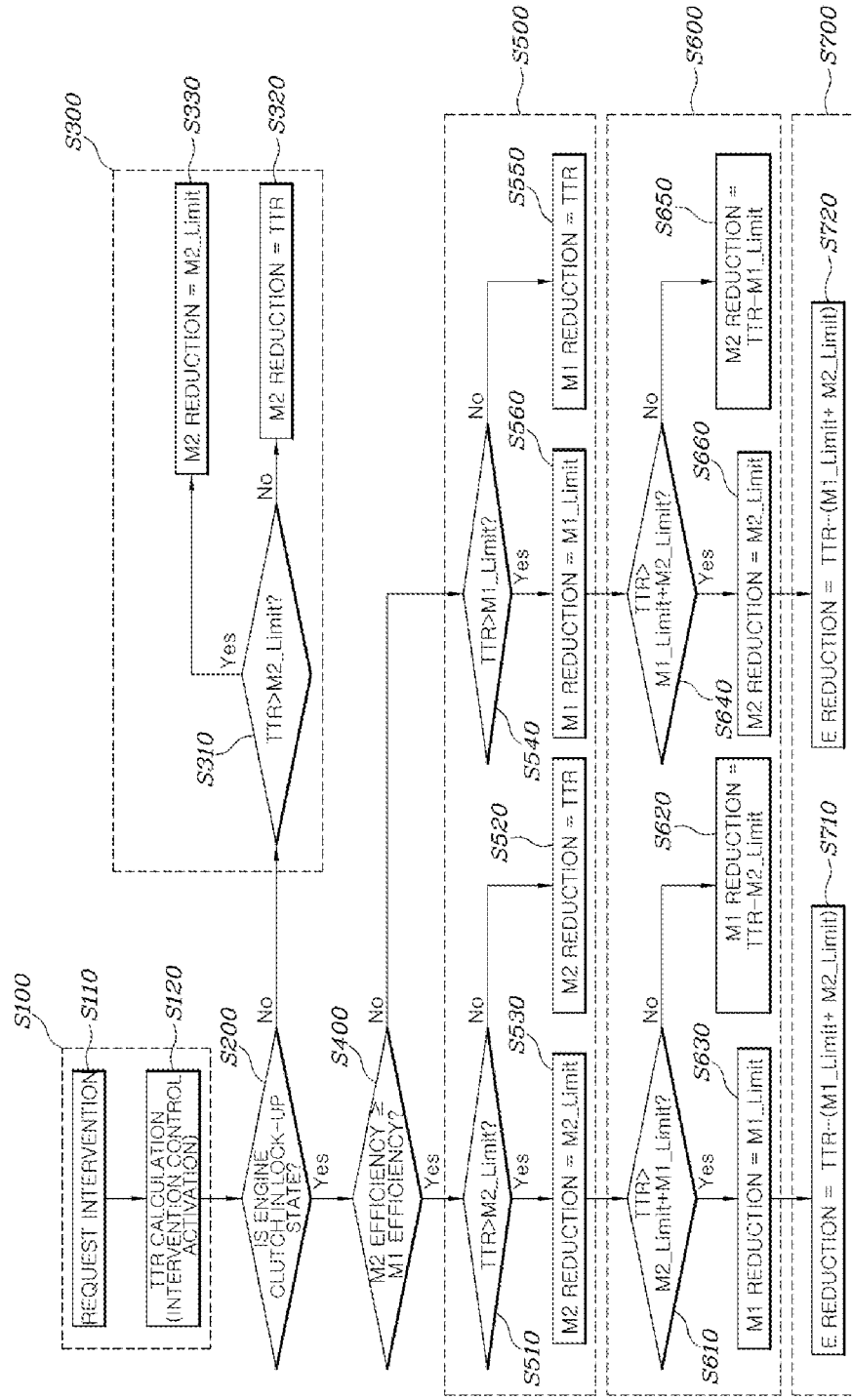
FIG. 4 is a flowchart illustrating an example of a shift control method of the hybrid electric vehicle illustrated in FIG. 3.

FIG. 4 is a flowchart illustrating an example of a shift control method of the hybrid electric vehicle illustrated in FIG. 3.

Referring to FIG. 4, the shift control method of the hybrid electric vehicle may include calculating a target torque reduction amount (S100), determining whether the engine clutch 120 is in a locked-up state (S200), setting the torque reduction amount of the second motor 140 (S300), setting the intervention control sequence (S400), setting the torque reduction amount of the higher priority control motor (S500), setting the torque reduction amount of the lower priority control motor (S600), and setting the torque reduction amount of the engine 110 (S700).

'E', 'M1' and 'M2' in FIG. 4 indicate the engine 110, the first motor 120, and the second motor 140, respectively, and 'TTR', 'M1_Limit' and 'M2_Limit' denotes the target torque reduction amount, the intervention limit of the first motor 120, and the intervention limit of the second motor 140, respectively.

In the step S100 of calculating the target torque reduction amount TTR, the hybrid controller 240 may calculate the target torque reduction amount TTR when there is an intervention request according to a shift signal received from the transmission controller 250. More specifically, the transmission controller 250 may determine whether the transmission 150 needs shifting, and when the shifting of the transmission 150 is required, request an intervention to the hybrid controller 240 (S110). The hybrid controller 240 may calculate a target torque reduction amount TTR in an activated state of the intervention control when there is an intervention request from the transmission controller 250 (S120). Although the hybrid controller 240 calculates the target torque reduction amount through the shift signal received from the transmission controller 230 in an implementation, in another implementation, the transmission controller 250 may determine the target torque reduction amount TTR and then transmit the same to the hybrid controller 240.

In the step S200 of determining whether the engine clutch 120 is in the locked-up state, by receiving information on the state of the engine clutch 130 from the clutch controller 230, it can be determined whether the engine clutch 130 is in the lock-up state.

In the step S300 of setting the torque reduction amount of the second motor 140, when it is determined that the engine clutch 130 is not in the locked-up state, the hybrid controller 240 may set the torque reduction amount of the second motor 140. More specifically, when it is determined that the engine clutch 130 is not in the locked-up state, the hybrid controller 240 may compare the target torque reduction amount TTR and the intervention limit M2_Limit of the second motor 140 (S310). When the target torque reduction amount TTR is equal to or less than the intervention limit M2_Limit of the second motor 140, the hybrid controller 240 may set the torque reduction amount of the second motor 140 to the target torque reduction amount TTR (S320). When the target torque reduction amount TTR exceeds the intervention limit M2_Limit of the second motor 140, the hybrid controller 240 may set the torque reduction amount of the second motor 140 to the intervention limit M2_Limit of the second motor 140 (S330).

In the step S400 of setting the intervention control sequence, when it is determined that the engine clutch 130 is in the locked-up state, the efficiency of the first motor 120 and the efficiency of the second motor 140 may be compared with each other, and the intervention control sequence may be set by designating the first motor 120 and the second motor 140 as a higher priority control motor and a lower priority control motor. More specifically, when the efficiency of the second motor 140 is equal to or greater than that of the first motor 120, the second motor 140 may be set as the higher priority control motor, and the first motor 120 may be set as the lower priority control motor. Conversely, when the efficiency of the second motor 140 is less than that of the first motor 120, the first motor 120 may be set as the higher priority control motor, and the second motor 140 may be set as the lower priority control motor.

In the step S500 of setting the torque reduction amount of the higher priority control motor, based on the result of comparing the target torque reduction amount TTR with the intervention limit of the higher priority control motor, the hybrid controller 240 may set the torque reduction amount of the higher priority control motor. More specifically, the step S500 of setting the torque reduction amount of the higher priority control motor may include: comparing the target torque reduction amount with the intervention limit of the higher priority control motor (S510, S540); when the target torque reduction amount TTR is less than or equal to the intervention limit of the higher priority control motor, setting the torque reduction amount of the higher priority control motor to the target torque reduction amount TTR (S520, S550); and when the target torque reduction amount TTR exceeds the intervention limit of the higher priority control motor, setting the torque reduction amount of the higher priority control motor to the intervention limit of the higher priority control motor (S530, S560). S510, S520, and S530 correspond to the case in which the second motor 140 is set as a higher priority control motor, and S540, S550, and S560 correspond to the case in which the first motor 120 is set as a higher priority control motor.

In the step S600 of setting the torque reduction amount of the lower priority control motor, when the target torque reduction amount TTR exceeds the intervention limit of the higher priority control motor, the torque reduction amount of the lower priority control motor may be set. More specifically, the step S600 of setting the torque reduction amount of the lower priority control motor may include the sub-steps of: when the target torque reduction amount exceeds the intervention limit of the higher priority control motor, comparing the target torque reduction amount and each of the intervention limits of the higher priority control motor and the lower priority control motor (S610, S640); when the target torque reduction amount TTR is less than or equal to the sum of the intervention limit of the higher priority control motor and the intervention limit of the lower priority control motor, setting the torque reduction amount of the lower priority control motor to a difference between the torque reduction amount TTR and the intervention limit of the higher priority control motor (S620, S650); and when the target torque reduction amount TTR exceeds the sum of the intervention limit of the higher priority control motor and the intervention limit of the lower priority control motor, setting the torque reduction amount of the lower priority control motor to the intervention limit of the lower priority control motor (S630, S660).

S610, S620, and S630 correspond to the case in which the second motor 140 is set as the higher priority control motor, and S640, S650 and S660 correspond to the case in which the first motor 120 is set as the higher priority control motor.

In the step S700 of setting the torque reduction amount of the engine 110, when the target torque reduction amount TTR exceeds the sum of the intervention limit of the higher priority control motor and the intervention limit of the lower priority control motor, the torque reduction amount of the engine 110 may be set to a value obtained by subtracting the sum of the intervention limit of the higher priority control motor and the intervention limit of the lower priority control motor from the target torque reduction amount TTR. S710 corresponds to the case in which the second motor 140 is set as the higher priority control motor, and S720 corresponds to the case in which the first motor 120 is set as the higher priority control motor.

Figure 5A:
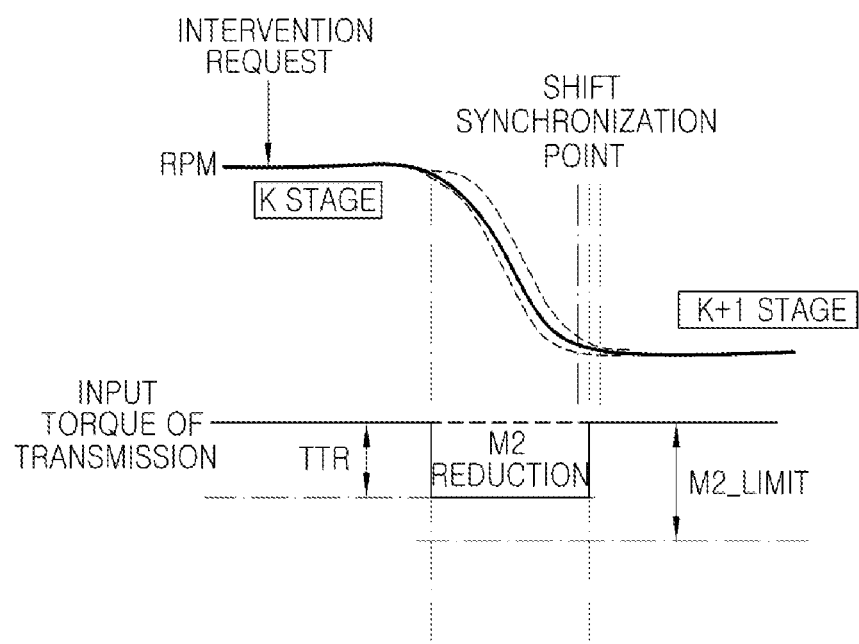
FIGS. 5A, 5B, 5C, 6A, 6B, and 6C are diagrams illustrating exemplary shift intervention control processes according to an example of the present disclosure.
Figure 5B:
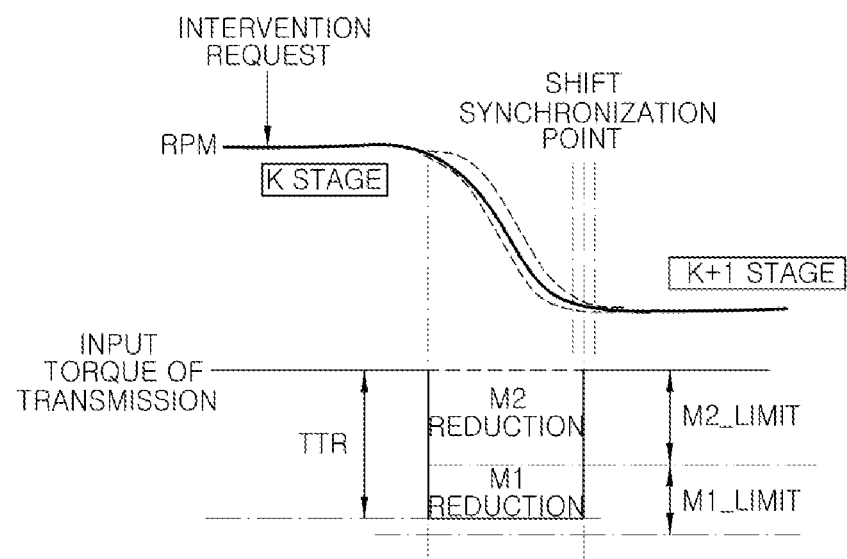
Figure 5C:
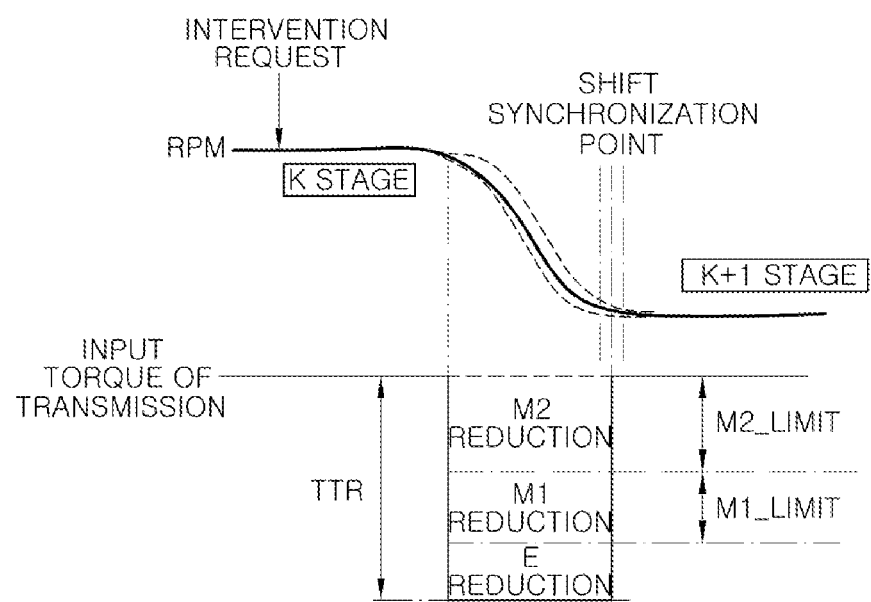
Figure 6A:
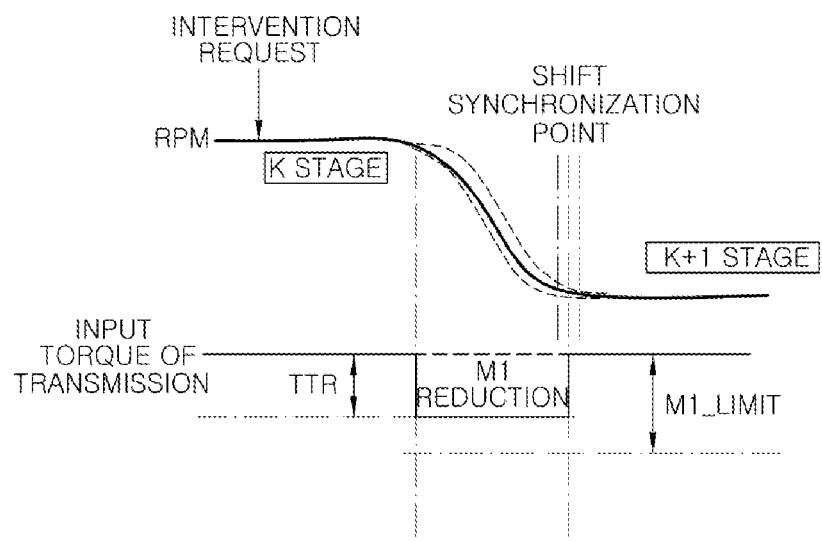
Figure 6B:
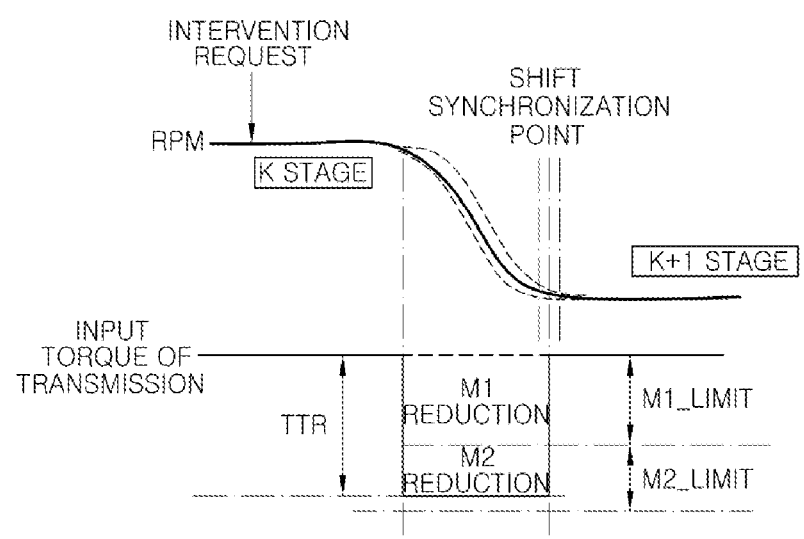
Figure 6C:
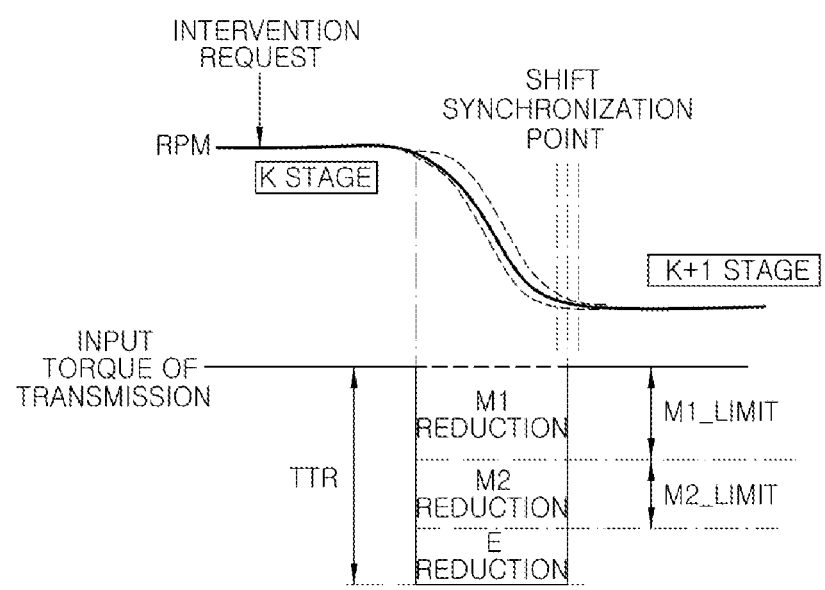

FIGS. 5A, 5B, 5C, 6A, 6B, and 6C are diagrams illustrating exemplary shift intervention control processes according to an implementation of the present disclosure. FIGS. 5A, 5B, and 5C illustrate exemplary shift intervention control processes when the second motor 140 is set as a higher priority control motor, and FIGS. 6A, 6B and 6C illustrate exemplary shift intervention control processes when the first motor 140 is set as a higher priority control motor.

In the processes illustrated in FIGS. 5A, 5B, 5C, 6A, 6B, and 6C, when the transmission controller 250 controls the shift to a higher stage from a k stage to a k+1 stage so that the hybrid controller 240 is requested for intervention, the hybrid controller 240 reduces the torque input to the transmission 150 through intervention control, so that revolution per minute (RPM) is reduced.

FIG. 5A is a case in which an intervention control operation is performed only on the second motor 140, FIG. 5B is a case in which an intervention control operation is performed on the first motor 120 and the second motor 140, and FIG. 5C is a case in which an intervention control operation is performed on all of the engine 110, the first motor 120, and the second motor 140.

Referring to FIGS. 5A, 5B, and 5C, it can be seen that the hybrid controller 240 performs intervention control on the second motor 140, the first motor 120, and the engine 110 in the order named according to the target torque reduction amount TTR.

Also, referring to FIG. 5C, when the target torque reduction amount TTR is large, the hybrid controller 240 may set the torque reduction amount of the second motor 140 and the torque reduction amount of the first motor 120 to the intervention limit M2_Limit of the second motor 140 and the intervention limit M1_Limit of the first motor 120, respectively, thereby minimizing the torque reduction amount of the engine 110.

FIG. 6A is a case in which an intervention control operation is performed only on the first motor 120, FIG. 6B is a case in which an intervention control operation is performed on the first motor 120 and the second motor 140, and FIG. 6C is a case in which an intervention control operation is performed on all of the engine 110, the first motor 120, and the second motor 140.

Referring to FIGS. 6A, 6B, and 6C, it can be seen that the hybrid controller 240 performs intervention control on the first motor 120, the second motor 140, and the engine 110 in the order named according to the target torque reduction amount TTR.

Also, referring to FIG. 6C, when the target torque reduction amount TTR is large, the hybrid controller 240 may set the torque reduction amount of the first motor 120 and the torque reduction amount of the second motor 140 to the intervention limit M1_Limit of the first motor 120 and the intervention limit M2_Limit of the second motor 140, respectively, thereby minimizing the torque reduction amount of the engine 110.

Accordingly, the hybrid controller 240 maximizes the intervention control amounts for the first motor 120 and the second motor 140 and minimizes the intervention control amount for the engine 110 lacking consistency and sophistication, thereby securing a consistent and precise shifting feeling by making the shift synchronization point constant.

In some implementations, the present disclosure described above can be implemented as computer-readable codes on a medium in which a program is recorded. The computer-readable medium includes all types of recording devices in which data readable by a computer system is stored.

Examples of computer-readable media include Hard Disk Drive (HDD), Solid State Disk (SSD), Silicon Disk Drive (SDD), ROM, RAM, CD-ROM, magnetic tape, floppy disk, optical data storage device, etc. Accordingly, the above detailed description should not be construed as restrictive in all respects, but as exemplary. The scope of the present disclosure should be determined by a reasonable interpretation of the appended claims, and all modifications within the equivalent scope of the present disclosure are included in the scope of the present disclosure.

What is claimed is:

1. A hybrid electric vehicle comprising:
an engine;
a first motor connected to the engine;
an engine clutch;
a second motor selectively connected to the first motor through the engine clutch;
a transmission connected to the second motor;
a transmission controller configured to determine whether to shift the transmission; and
a hybrid controller configured to (i) compare a target torque reduction amount according to a shift signal received from the transmission controller with an intervention limit of the first motor and an intervention limit of the second motor based on the engine clutch being in a locked-up state, (ii) set torque reduction amounts of the engine, the first motor, and the second motor, respectively, based on the comparison result, and (iii) output a torque command for controlling the torques of the engine, the first motor, and the second motor, respectively, based on the set torque reduction amounts,
wherein the hybrid controller is configured to set an intervention control sequence by designating the first motor and the second motor as a higher priority control motor and a lower priority control motor.

2. The hybrid electric vehicle according to claim 1, wherein the hybrid controller is configured to, based on the target torque reduction amount being equal to or less than the intervention limit of the higher priority control motor, set the torque reduction amount of the higher priority control motor to the target torque reduction amount, and to, based on the target torque reduction amount exceeding the intervention limit of the higher priority control motor, set the torque reduction amount of the higher priority control motor to the intervention limit of the higher priority control motor.

3. The hybrid electric vehicle according to claim 2, wherein the hybrid controller is configured to set the intervention control sequence according to the result of comparing the efficiency of the first motor and the efficiency of the second motor according to a target operating point based on output torques and revolutions per minute (RPMs) of the first and second motors in which the target torque reduction amount is reflected.

4. The hybrid electric vehicle according to claim 2, wherein the hybrid controller is configured, based on the target torque reduction amount exceeding the intervention limit of the higher priority control motor, to:
based on the target torque reduction amount being less than or equal to the sum of the intervention limit of the higher priority control motor and the intervention limit of the lower priority control motor, set the torque reduction amount of the lower priority control motor to the difference between the target torque reduction amount and the torque reduction amount of the higher priority control motor; and
based on the target torque reduction amount exceeding the sum of the intervention limit of the higher priority control motor and the intervention limit of the lower priority control motor, set the torque reduction amount of the lower priority control motor to the intervention limit of the lower priority control motor.

5. The hybrid electric vehicle according to claim 4, wherein the hybrid controller is configured to:
based on the target torque reduction amount exceeding the sum of the intervention limit of the higher priority control motor and the intervention limit of the lower priority control motor, set the torque reduction amount of the engine to the difference between the target torque reduction amount and the sum of the intervention limit of the higher priority control motor and the intervention limit of the lower priority control motor.

6. The hybrid electric vehicle according to claim 1, wherein the first motor is disposed between the engine and the engine clutch, and the second motor is disposed between the engine clutch and the transmission.

7. The hybrid electric vehicle according to claim 6, wherein the hybrid controller is configured, based on the engine clutch not being in the lock-up state, to:
based on the target torque reduction amount being equal to or less than the intervention limit of the second motor, set the torque reduction amount of the second motor to the target torque reduction amount; and
based on the target torque reduction amount exceeding the intervention limit of the second motor, set the torque reduction amount of the second motor to the intervention limit of the second motor.

8. The hybrid electric vehicle according to claim 1, wherein the intervention limit of the first motor is determined depending on at least one of a state of charge of a battery, an internal temperature of the battery, or an internal temperature of the first motor, and wherein the intervention limit of the second motor is determined depending on at least one of a state of charge of a battery, an internal temperature of the battery, or an internal temperature of the second motor.

9. A method of controlling shifting of a hybrid electric vehicle comprising an engine, a first motor, an engine clutch, a second motor, and a transmission, the method comprising:
calculating a target torque reduction amount for the transmission to shift;
determining whether the engine clutch is in a locked-up state;
based on the engine clutch being determined to be in the locked-up state, setting an intervention control sequence by designating the first motor and the second motor as a higher priority control motor and a lower priority control motor;
setting a torque reduction amount of the higher priority control motor based on a result of comparing the target torque reduction amount with an intervention limit of the higher priority control motor; and
based on the target torque reduction amount exceeding the intervention limit of the higher priority control motor, setting a torque reduction amount of the lower priority control motor,
wherein the first motor is connected to the engine, and the second motor is connected to an input shaft of the transmission.

10. The method according to claim 9, wherein the first motor is disposed between the engine and the engine clutch, and the second motor is disposed between the engine clutch and the transmission.

11. The method according to claim 9, further comprising the step of, based on determining that the engine clutch is not in the locked-up state, setting a torque reduction amount of the second motor.

12. The method according to claim 9, wherein setting the intervention control sequence comprises designating the first motor and the second motor as a higher priority control motor and a lower priority control motor by comparing the efficiency of the first motor with the efficiency of the second motor.

13. The method according to claim 9, wherein setting the torque reduction amount of the higher priority control motor comprises:
comparing the target torque reduction amount with the intervention limit of the higher priority control motor;
based on the target torque reduction amount being equal to or less than the intervention limit of the higher priority control motor, setting the torque reduction amount of the higher priority control motor to the target torque reduction amount; and
based on the target torque reduction amount exceeding the intervention limit of the higher priority control motor, setting the torque reduction amount of the higher priority control motor to the intervention limit of the higher priority control motor.

14. The method according to claim 9, wherein setting the torque reduction amount of the lower priority control motor comprises the sub-steps of:
based on the target torque reduction amount exceeding the intervention limit of the higher priority control motor, comparing the target torque reduction amount with the intervention limit of the higher priority control motor and the intervention limit of the lower priority control motor;
based on the target torque reduction amount being less than or equal to the sum of the intervention limit of the higher priority control motor and the intervention limit of the lower priority control motor, setting the torque reduction amount of the lower priority control motor to the difference between the target torque reduction amount and the torque reduction amount of the higher priority control motor; and
based on the target torque reduction amount exceeding the sum of the intervention limit of the higher priority control motor and the intervention limit of the lower priority control motor, setting the torque reduction amount of the lower priority control motor to the intervention limit of the lower priority control motor.

15. The method according to claim 9, further comprising:
setting the torque reduction amount of the engine based on the target torque reduction amount exceeding the sum of the intervention limit of the higher priority control motor and the intervention limit of the lower priority control motor.

16. A non-transitory computer-readable recording medium having stored thereon a program for executing a shift control method of a hybrid electric vehicle comprising:
calculating a target torque reduction amount for a transmission to shift;
determining whether an engine clutch is in a locked-up state;
based on the engine clutch being determined to be in the locked-up state, setting an intervention control sequence by designating a first motor and a second motor as a higher priority control motor and a lower priority control motor;
setting a torque reduction amount of the higher priority control motor based on a result of comparing the target torque reduction amount with an intervention limit of the higher priority control motor; and
based on the target torque reduction amount exceeding the intervention limit of the higher priority control motor, setting a torque reduction amount of the lower priority control motor, wherein the first motor is connected to the engine, and the second motor is connected to an input shaft of the transmission.

* * * * *